United States Patent [19]

Oiso et al.

[11] 3,718,903

[45] Feb. 27, 1973

[54] CIRCUIT ARRANGEMENT FOR CHECKING STORED INFORMATION

[75] Inventors: Mitsuo Oiso, Yasuo Endo, both of Kawasaki, Japan

[73] Assignee: Fujitsu Limited, Kawasaki, Japan

[22] Filed: Nov. 18, 1970

[21] Appl. No.: 90,670

Related U.S. Application Data

[63] Continuation-in-part of Ser. No. 670,545, Sept. 26, 1967, abandoned.

[52] U.S. Cl. .......................................... 340/146.1 AL

[51] Int. Cl. .......................................... G06f 11/10

[58] Field of Search .........340/146.1 AG, 146.1 AL, 174 ED

[56] References Cited

UNITED STATES PATENTS

| | | | |
|---|---|---|---|
| 2,689,950 | 9/1954 | Bayliss et al. | 340/146.1 X |
| 3,218,608 | 11/1965 | Barbeau | 340/146.1 |
| 3,460,117 | 8/1969 | Cohn et al. | 340/146.1 |

*Primary Examiner*—Charles E. Atkinson
*Attorney*—Curt M. Avery, Arthur E. Wilfond, Herbert L. Lerner and Daniel J. Tick

[57] ABSTRACT

A counter counts specific bits in each of the digits of information and indicates specific bits to form check bits. An input supplies stored information of N digits each including a determined number of bits to the inputs of the counter. A first shift register has inputs coupled to the outputs of the counter for determining a first check digit by counting the supplied information and storing the output of the counter. A write circuit is connected to an output of the first shift register and is positioned in operative proximity with a magnetic storage for recording the first check digit in the magnetic storage. A readout circuit is connected to an input of the first shift register and is positioned in operative proximity with the magnetic storage for reading out information from the magnetic storage. A second shift register has an input coupled to the input and outputs coupled to the inputs of the first shift register for determining a second check digit by counting determined digits of the supplied information and transferring the counted determined digits to the first register. The write circuit records the second check digit in the magnetic storage. A collator has inputs coupled to the input and to the outputs of the counter and of the first shift register for collating the first check digit in the output of the counter with the first check digit read out from the magnetic storage and for collating the second check digit in the output of the second shift register with the second check digit read out from the magnetic storage. A feedback coupled between the outputs of the first shift register and the input adds parity bits to the stored information. An output connected to the feedback provides the stored information with the included parity bits.

9 Claims, 11 Drawing Figures

INHIBIT GATE

OR GATE

AND GATE

COLLATOR

CIRCUIT ARRANGEMENT FOR CHECKING STORED INFORMATION

The present invention relates to a checking circuit. More particularly, the invention relates to a circuit arrangement for checking stored information. This application is a continuation-in-part of our application Ser. No. 670,545, filed Sept. 26, 1967 and now abandoned.

Errors often occur in the write-in and readout of data stored in a recording medium such as, for example, a magnetic drum, a magnetic disc, a magnetic card or tape, or the like. This is due to mechanical gaps of non-uniform dimensions between the recording medium and the transducer (write-in or readout head). Errors also occur due to damage of the transducer when it contacts the recording medium, due to dust or foreign matter between the transducer and the recording medium, or due to a fault in the recording medium such as, for example, in the recording surface. It is therefore important to check the stored data or storage information for error.

There are several arrangements for detecting errors in stored data. In a generally utilized arrangement, digits representing the data are considered as a group and an extra bit is inserted. The extra bit is inserted in the digit next to the highest or lowest digit and is so selected that the number of "1"s in the group of digits is an even or an odd number. If the number of "1"s is an even number, the arrangement is an even parity check and if the number of "1"s is an odd number, the arrangement is an odd parity check. The extra bit is the parity bit.

In another arrangement, the parity bit is added to each digit, but in such arrangement one of the digits is utilized exclusively for checking for errors. This prevents the maximum utilization of data storage space in order to permit the storage of a maximum quantity of data.

In still another arrangement, a single parity bit is provided for two adjacent digits. This reduces the reliability of the checking to half, although it permits more data to be stored than in an arrangement wherein a parity bit is added to each digit. The reduction of reliability is due to the provision of only a single parity bit for each pair of adjacent digits. In a magnetic recording medium such as, for example, a drum or disc, an error often occurs in several successive digits at a time, so that there is a great probability that errors may occur in adjacent digits. It is therefore often impossible to detect an error if one parity bit is provided for a pair of adjacent digits.

The principal object of the present invention is to provide a new and improved circuit arrangement for checking stored information. The circuit arrangement of the present invention checks stored data with reliability, accuracy, efficiency and effectiveness. The circuit arrangement of the present invention permits the storage of a maximum quantity of data by maximum utilization of data storage space by utilizing a smaller number of check or parity bits than in known arrangements. The circuit arrangement of the present invention considerably reduces the probability of inaccuracy in detecting errors by providing check bits for digits which are spaced from each other rather than adjacent each other.

In accordance with the present invention, a circuit arrangement for checking stored information comprises a counter for counting specific bits in each of the digits of the information and for indicating specific bits to form timing signals, the counter having inputs and outputs. Input means supply stored information of N digits, each including a determined number of bits, to the inputs of the counter. A first shift register has inputs coupled to the outputs of the counter and outputs coupled to the input means of the counter for determining a first timing signal by counting the supplied information and storing the output of the counter. A write circuit is connected to an output of the first shift register and is positioned in operative proximity with a magnetic storage for recording data including the first timing signal in the magnetic storage. A readout circuit is connected to an input of the first shift register and is positioned in operative proximity with the magnetic storage for reading out information from the magnetic storage. A second shift register has an input coupled to the input means and outputs coupled to the inputs of the first shift register for determining a second timing signal by counting determined digits of the supplied information and transferring the counted determined digits to the first register. The write circuit records the second timing signal in the magnetic storage. A collator has an output and inputs coupled to the input and to the outputs of the counter and of the first shift register for collating the first check digit in the output of the counter with the first check digit read out from the magnetic storage and for collating the second check digit in the output of the second shift register with the second check digit read out from the magnetic storage. A feedback is coupled between the outputs of the first shift register and the input for adding parity bits to the stored information. An output is connected to the feedback for providing the stored information with the included parity bits.

The input means include a register and the counter comprises a binary counter. The input of the second shift register is coupled to the input means via an EXCLUSIVE OR gate. An AND gate is connected between the output of the second shift register and inputs of the first shift register for transferring the stored information to the first shift register under the control of a write signal and an additional signal. An AND gate group is connected between the outputs of the counter and inputs of the first shift register for transferring the output of the counter to the first shift register under the control of a write signal and the first timing signal. An AND gate group is connected between the outputs of the second shift register and inputs of the first shift register for transferring the output of the second shift register to the first shift register under the control of a write signal and the second timing signal. An AND gate group is connected between the outputs of the counter and an input of the collator for transferring the output of the counter to the collator under the control of a read signal and the first timing signal. Another AND gate group is connected between the outputs of the first shift register and another input of the collator for transferring the output of the first shift register to the collator under the control of the read signal and one of the first and second timing signals. An AND gate group is connected between the outputs of the second shift register and an input of the collator for transferring the output of the second shift register to the collator under the control of a read signal and the second timing signal.

In order that the present invention may be readily carried into effect, it will now be described with reference to the accompanying drawings, wherein.

Figure 2:
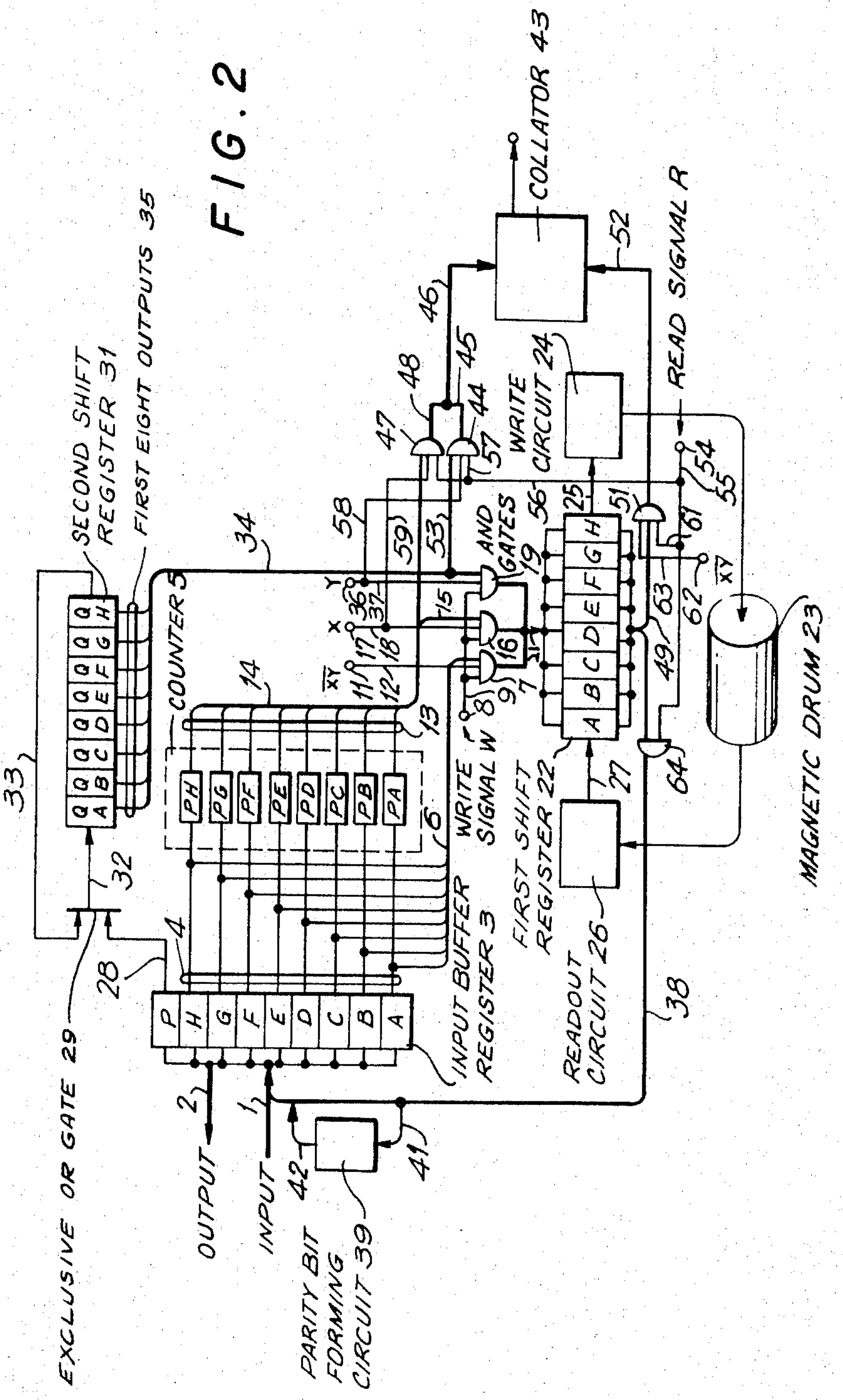
FIG. 2 is a block diagram of an embodiment of the circuit arrangement of the present invention.
Figure 8:
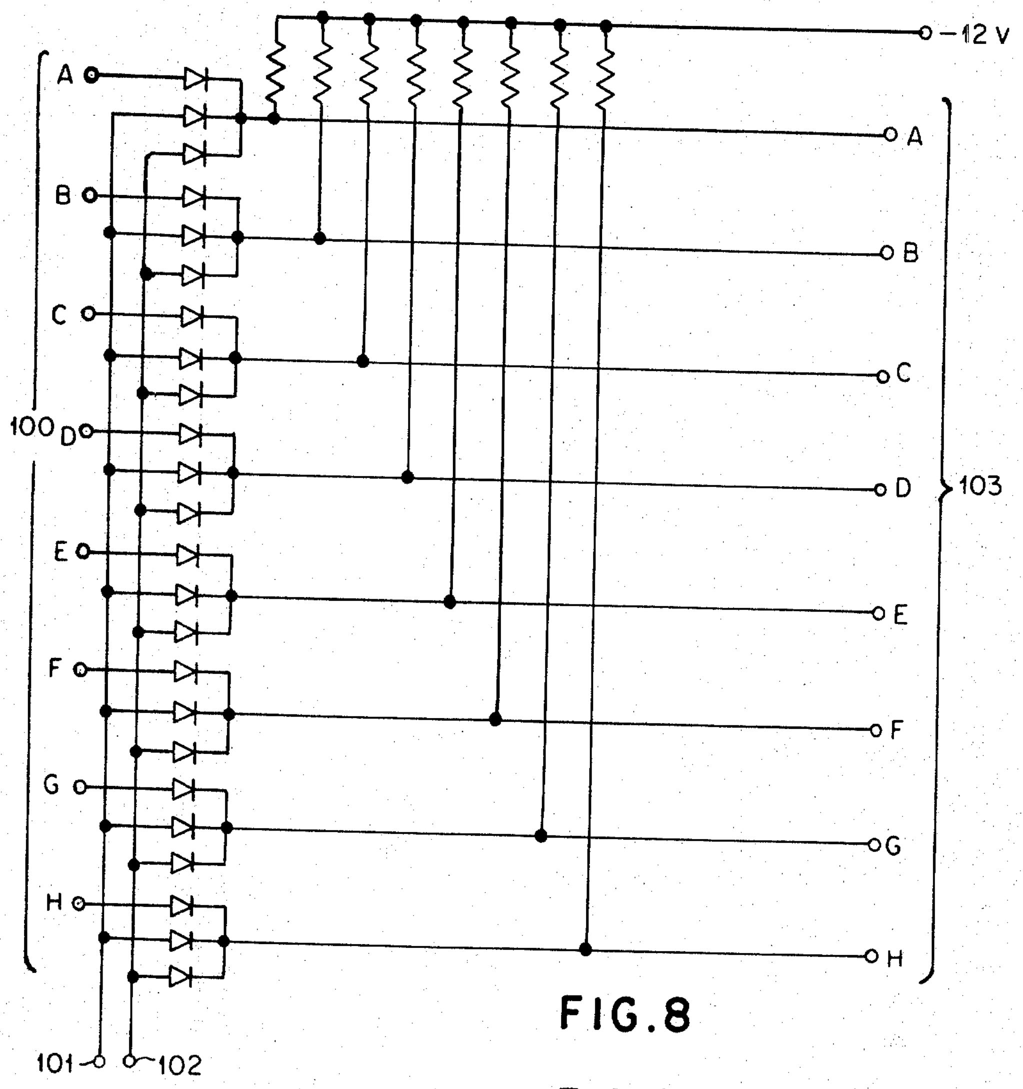
Figure 9:
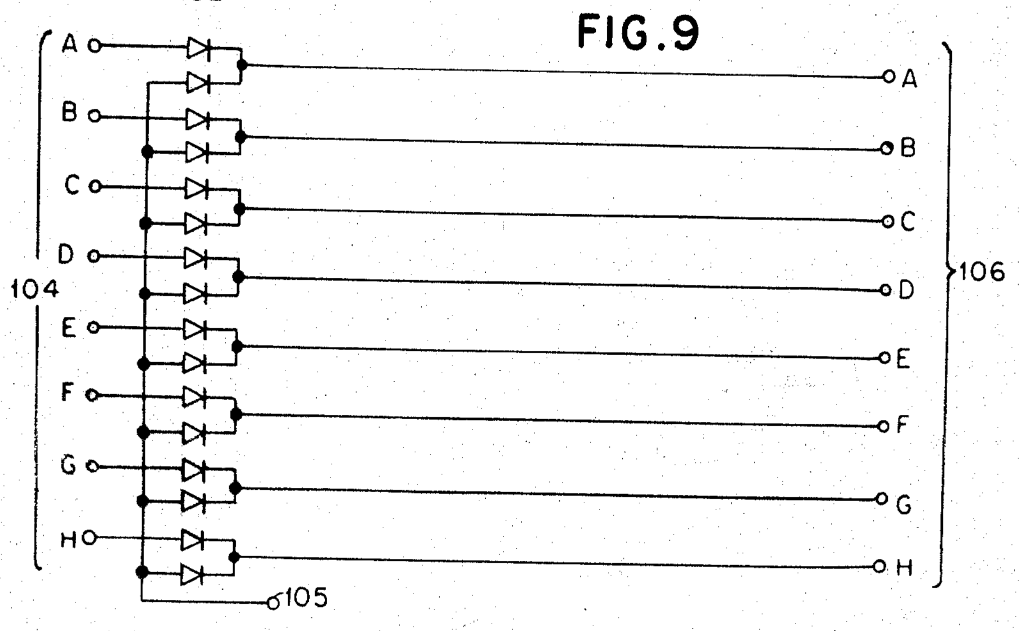
Figure 10:
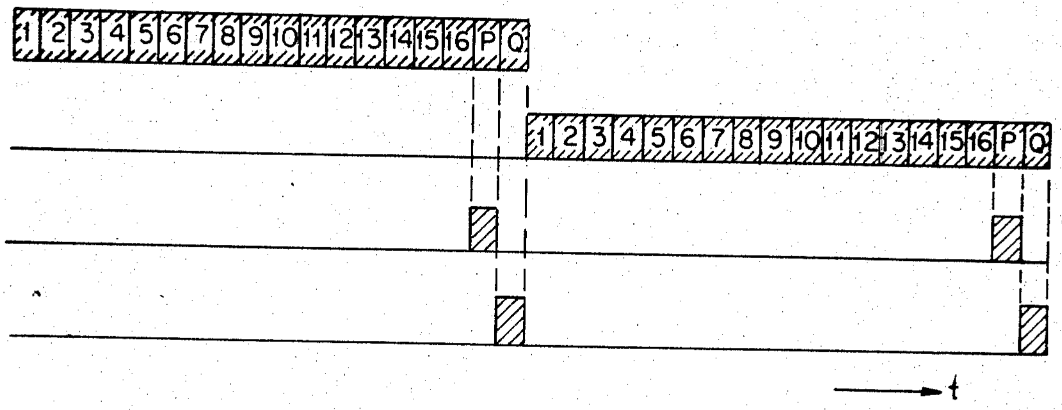
Figure 11:
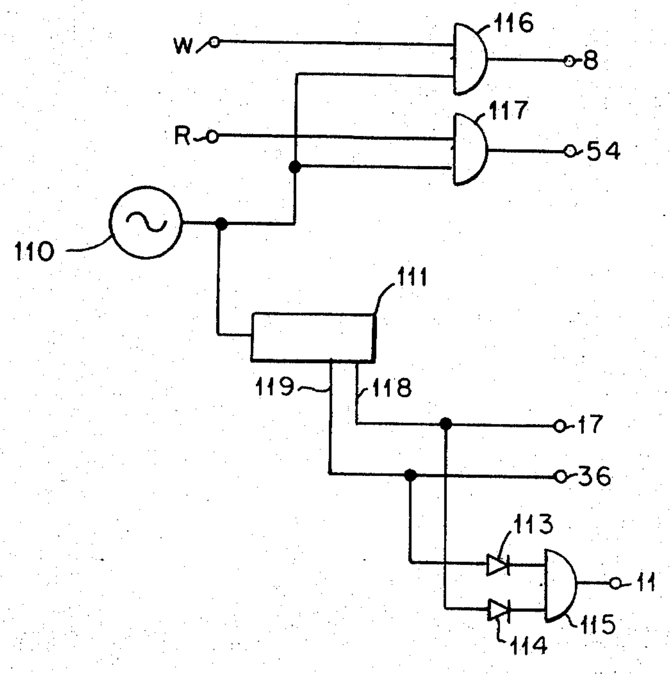

FIGS. 8 and 9 are circuit diagrams illustrating details of the AND gate groups of FIG. 2; and FIGS. 10 and 11 are a timing diagram and a circuit diagram, respectively, for transmission 4 the control signals to the respective terminals of FIG. 2.

Figure 1:
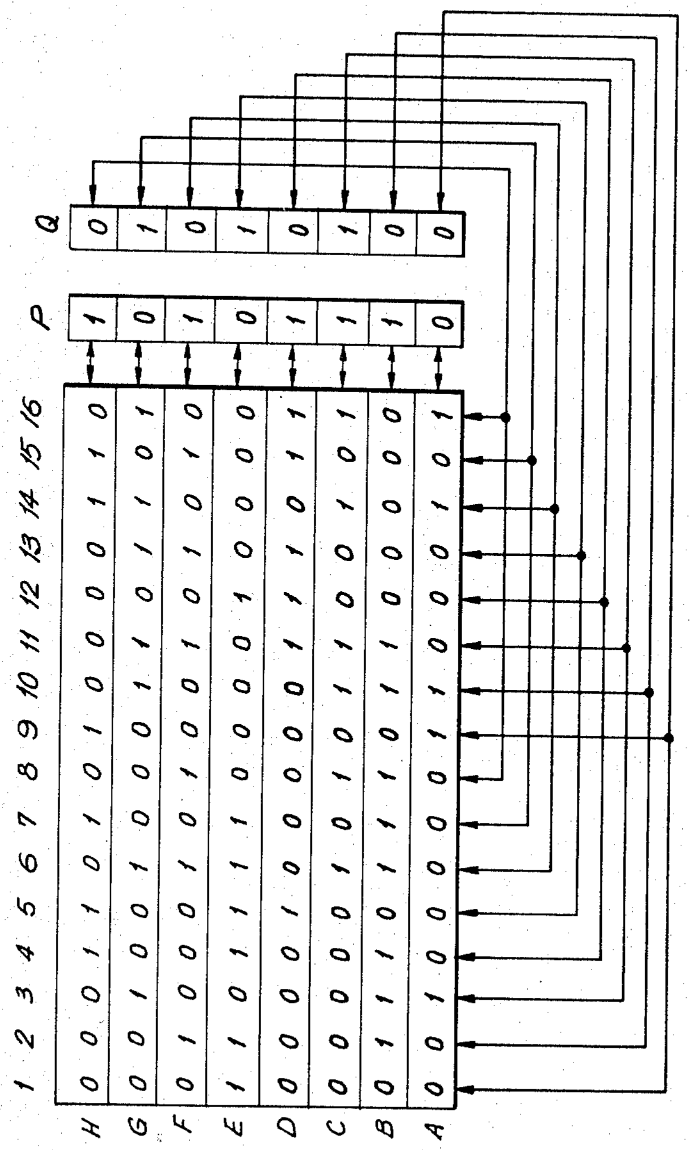
FIG. 1 is a diagram for explaining the principle of operation of the present invention.

In FIG. 1, the data or information comprises N digits, N being 16 in the example illustrated. Each digit comprises T bits, T being 8 in the example illustrated. A first check digit P has eight bits and a second check digit Q has eight bits. The A bit of the first check digit P is the parity or check bit for the A bits of the N digits, the B bit of the first check digit is the parity or check bit for the B bits of the N digits, and so on.

The A bit of the second check digit Q is the parity or check bit for the first, ninth, 17th, and so on, digit, the B bit of the second check digit is the parity or check bit for the second, 10th, 18th, and so on, digit, the C bit of the second check digit is the parity or check bit for the third, 11th, 19th, and so on, digit, and so on.

In the arrangement illustrated in FIG. 1, the number of bits, including the parity or check bits, is $(N+2)8$. When $N$ is larger than 16, the number of check bits becomes smaller than in a known parity bit arrangement.

In parity bit arrangements, an error of one bit in the stored data is readily detected. When there is an error of two bits in the stored data, the probability that the error will be detected in a known parity bit arrangement is $$9C_2NP^2 = 36NP^2$$

where $P$ is the probability of occurrence of an error of one bit and $N$ is the number of stored digits.

The probability that the error will be undetected in the parity bit arrangement of the present invention is $$64\frac{N}{8}C_2P^2 = \frac{N(N-8)P^2}{2}$$

When $N$ is less than 80, the probability that the error will be undetected in the parity bit arrangement of the present invention is less than in the known parity bit arrangement. When $N$ equals 80, the probability that the error will be undetected is the same in the parity bit arrangement of the present invention and in the known parity bit arrangements, and the parity bit arrangement of the present invention utilizes one fifth the number of check bits utilized by the known parity bit arrangements. The arrangement of the present invention permits the utilization of 91 percent of the storage space utilized by the known arrangements.

FIG. 2 is a block diagram of an embodiment of a circuit arrangement of the present invention for checking stored information. In the embodiment of FIG. 2, it is assumed that $N$ equals 16 and that the data or information is stored in a magnetic drum. In FIG. 2, the heavy circuit lines indicate a plurality of electrically conductive leads which transfer data in parallel. Data or information is supplied to the circuit arrangement via an input lead 1 and is derived from the circuit via an output lead 2. Each of the input and output leads 1 and 2 comprises nine electrical conductors corresponding to the bits A, B, C, D, E, F, G, H and P. The light circuit lines indicate a single electrically conductive lead.

Data is transferred as electrical pulses. If the electrical potential is greater than zero volts, the data indication is "1." If the electrical potential is zero volts, the data information is "0."

The supplied data or information is fed to an input buffer register 3 which comprises any suitable register for temporarily storing data comprising nine bits consisting of eight information or data bits and the check or parity bit P. The input register 3 may comprise, for example, nine flip flop circuits such as, for example, transistor flip flops connected in parallel relation. The inputs of the eight data storing and one check bit storing flip flops of the input register 3 are connected to the input lead 1 which is connected to the data source (not shown in the figures). The data source (not shown in the figures) provides the data and check bit in parallel and each bit of the data and the check bit sets the corresponding flip flop if it is "1" and resets the corresponding flip flop if it is "0."

A plurality of leads 4 are each connected to the output of a corresponding one of the eight data storing flip flops of the input register 3. Each of the leads 4 is connected to a corresponding one of the inputs of a counter 5. Each of the leads 4 is thus connected to a corresponding counting stage of the counter 5. The eight leads 4 are connected via a lead 6 to an input of an AND gate group 7. The AND gate group 7 comprises eight AND gates corresponding to the eight leads 4. A write signal is supplied to each second input of the eight AND gates of the AND gate group 7 via a write terminal 8 and a lead 9. When a control signal X is not supplied to a terminal 17 and a control signal Y is not supplied to a terminal 36, a control signal $\overline{XY}$ is supplied to a terminal 11. The control signal $\overline{XY}$ is supplied to the third input of the eight AND gates of the AND gate group 7 via the lead 12. Each AND gate of the AND gate group 7 has three inputs.

The counter 5 counts the specific bits in each of the digits of the information and determines the first check digit P. The counter 5 may comprise any suitable counter comprising a plurality of binary counter stages PA, PB, PC, PD, PE, PF, PG and PH, each of which may comprise, for example, a transistor flip flop circuit. The input lead 1 and the input buffer register 3 supply the stored data or information of $N$ digits, each including a determined number of bits, to the inputs of the counter 5 via the leads 4.

A plurality of leads 13 are connected to the output of a corresponding one of the flip flops or binary counter stages of the counter 5. The eight leads 13 are connected via a lead 14 and a lead 15 to an input of an AND gate group 16. The AND gate group 16 comprises eight AND gates corresponding to the eight leads 13. The write signal is supplied to each second input of the eight AND gates of the AND gate group 16 via the write terminal 8 and the lead 9. The control signal X is supplied to each third input of the eight AND gates of the AND gate group 16 via the terminal 17 and a lead 18. The counter 5 provides the first check digits P of the bits A, B, C, D, E, F, G and H as 16 clock or timing pulses.

The outputs of the AND gate groups 7 and 16 and an AND gate group 19 are connected via a lead 21 to the first inputs of a first shift register 22. The first shift register 22 stores the output information of the counter 5 via the AND gate group 16 and counts the supplied information via the AND gate group 16. The first shift register 22 may comprise any suitable shift register and comprises eight flip flops connected in series. The first shift register 22 operates to temporarily store the aforementioned data from the input register 3 which is to be recorded on a magnetic storage drum 23 or data which is read out from the magnetic storage drum.

A write circuit 24 is connected to a second output of the first shift register 22 via a lead 25 and is positioned in operative proximity with the magnetic drum 23. The write circuit records or stores data including the first check digit P on the magnetic drum 23. A readout circuit 26 is connected to a second input of the first shift register 22 via a lead 27 and is positioned in operative proximity with the magnetic drum 23. The readout circuit reads out information or data from the magnetic storage drum 23. Readout from the magnetic drum 23 is synchronous in series, bit by bit.

A lead 28 is connected from the output of the flip flop of the input register 3 storing the first check bit to an input of an EXCLUSIVE OR gate 29. The EXCLUSIVE OR gate 29 has an output connected to the input of a second shift register 31 via a lead 32. The second shift register 31 may be the same as the first shift register 22 and may comprise any suitable shift register. The second shift register 31 comprises eight flip flops QA, QB, QC, QD, QE, QF, QG and QH connected in series. A signal output of the second shift register 31 is connected to the other input of the EXCLUSIVE OR gate 29 via a feedback lead 33.

The second shift register 31 is advanced in the order of A to H by eight clock or timing pulses and when the eighth pulse is provided in the second output of said register it is resupplied to the input of said register via the feedback lead 33. The EXCLUSIVE OR gate 29 provides an electrical potential corresponding to "1" at its output only when the signal supplied to one of its inputs is logically different from the signal supplied to the other of its inputs. The EXCLUSIVE OR gate is provided at each parity or check bit, which is provided at every eighth digit.

The second shift register 31 thus determines the second check or parity digit Q by counting determined digits of the supplied information and transferring the counted determined digits to the first shift register 22 via a lead 34 which connects the first eight outputs 35 of the second shift register 31 to an input of the AND gate group 19. The AND gate group 19 comprises eight AND gates corresponding to the eight outputs 35. The write signal is supplied to each second input of the eight AND gates of the AND gate group 19 via the write terminal 8 and the lead 9. The control signal Y is supplied to the third input of the eight AND gates of the AND gate group 19 via the terminal 36 and a lead 37. The second shift register 31 is thus circulated by 16 clock or timing pulses in order to provide the second check digit Q. The write circuit 24 also records or stores the second check or parity digit Q on the magnetic drum 23.

Data or information which has been temporarily stored in the input register 3 is supplied to the AND gate group 7 via the leads 4 and 6 and is transferred to the first shift register 22 when a write signal and the control signal $\overline{XY}$ are supplied to said AND gate group via the leads 9 and 12, respectively, thereby switching said AND gate group to its conductive condition. The write signal also actuates the write circuit 24 to store the data in the designated position on the magnetic drum 23.

The output of the counter 5, which is the first check or parity digit P, is transferred via the AND gate group 16 from said counter to the first shift register 22 when a write signal and the control signal X are supplied to said AND gate group via the leads 9 and 18, respectively, thereby switching said AND gate group to its conductive condition. The output of the second shift register 31, which is the second check or parity digit Q, is transferred via the AND gate 19 from said second shift register to the first shift register 22 when a write signal and the control signal Y are supplied to said AND gate group via the leads 9 and 37, respectively, thereby switching said AND gate group to its conductive condition.

Data which has been read out from the magnetic drum 23, bit by bit, in series, by the readout circuit 26 is transferred to the first shift register 22 via the lead 27 under the control of eight clock pulses. The first shift register 22 then transfers the read out data or information to the input buffer register 3 via a lead 38 and the input lead 1. The lead 38 is a common connection of the outputs of the first shift register 22.

Figure 3:
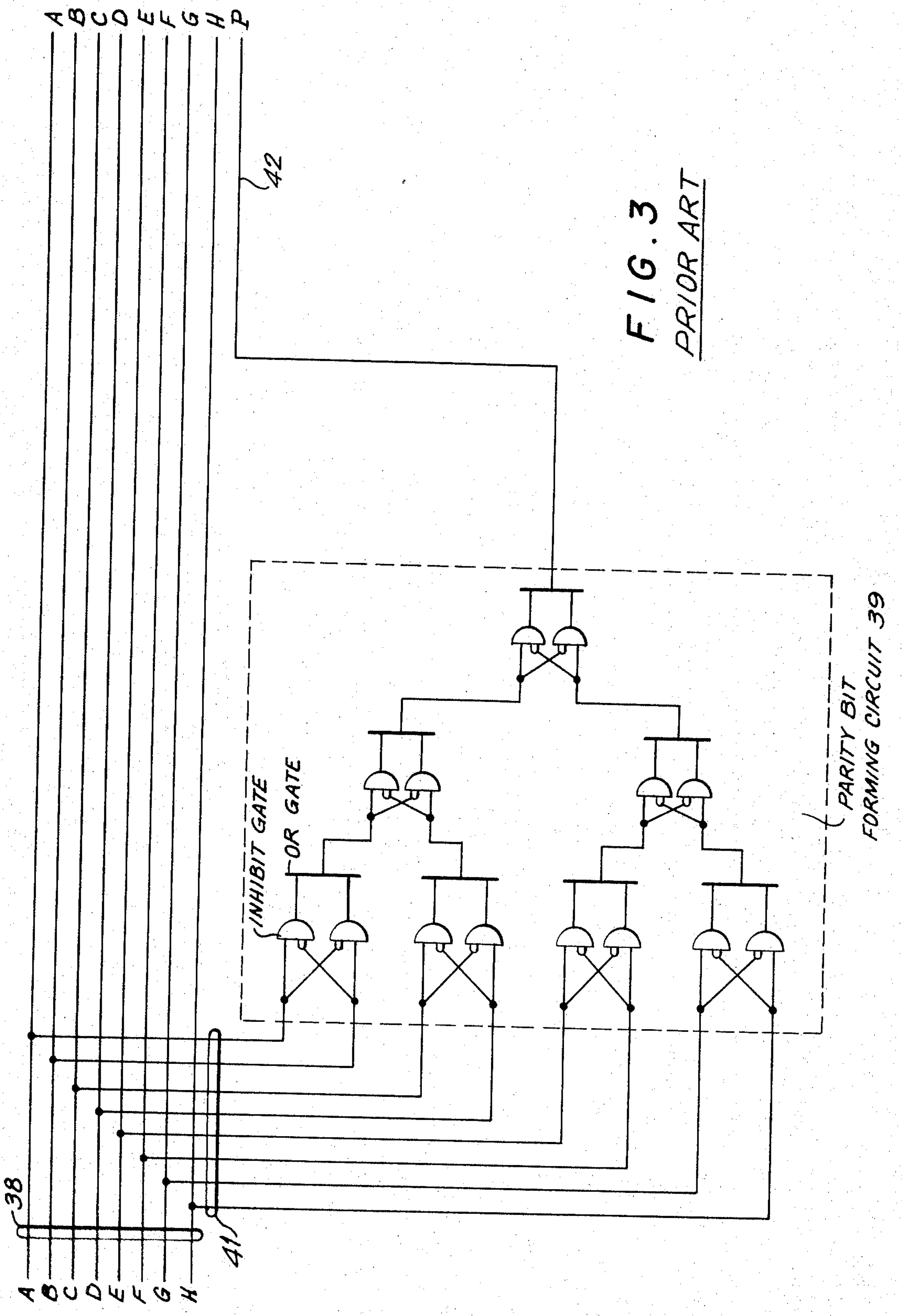
FIG. 3 PRIOR ART
FIG. 3 is a block diagram of a known embodiment of a parity bit forming circuit which may be utilized in FIG. 2.
Figure 4:
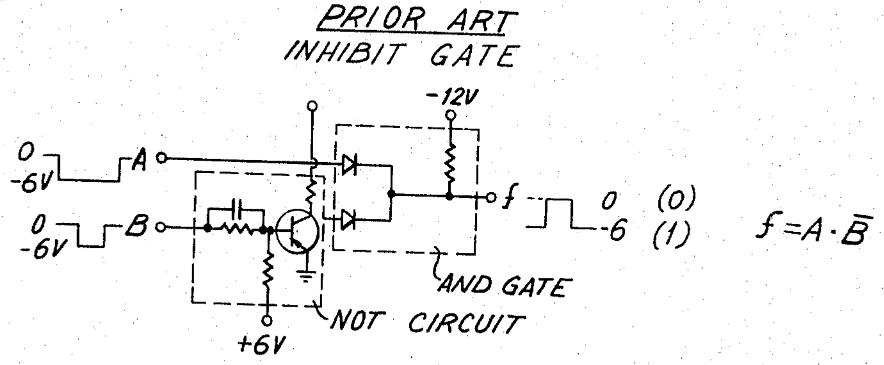
FIG. 4 PRIOR ART
FIG. 4 is a circuit diagram of a known embodiment of an inhibit gate which may be utilized in FIGS. 3 and 7.
Figure 5:
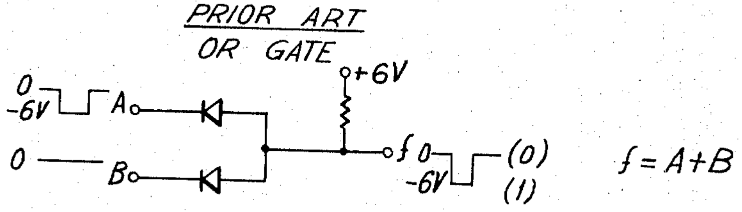
FIG. 5 PRIOR ART
FIG. 5 is a circuit diagram of a known embodiment of an OR gate which may be utilized in FIGS. 2, 3 and 7.
Figure 6:
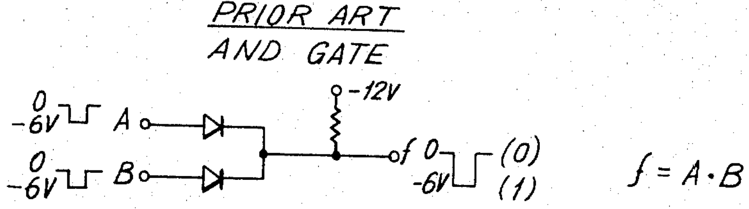
FIG. 6 PRIOR ART
FIG. 6 is a circuit diagram of a known embodiment of an AND gate which may be utilized in FIGS. 2 and 4.

A parity bit forming circuit 39 is connected in shunt with a part of the lead 38 via leads 41 and 42 and supplies a first parity or check digit or bit P, which is added to the signals in said lead. The parity bit forming circuit 39 may comprise any suitable parity bit forming circuit such as, for example, that shown in FIG. 3. The circuit of FIG. 3 is a known circuit and utilizes known inhibit gates and known OR gates, shown in FIGS. 4 and 5, respectively. Since these circuits are known, they are not herein described in detail. FIG. 6 shows a known AND gate which may be utilized as each AND gate of the circuit of FIG. 2.

The data to which the first parity or check digit or bit P is added is stored in the input buffer register 3 and is transferred in parallel as one digit via the output lead 2 to a suitable utilization circuit or storage (not shown in the figures).

Meanwhile, the first check digit P is continuously provided by the counter 5 and the second check digit Q is continuously provided by the second shift register 31. The first and second check or parity digits are collated simultaneously with the occurrence of the first and second check digits P and Q read out after the data. That is, in the read cycle, the AND gate groups 7, 16 and 19 are in their non-conductive condition.

Figure 7:
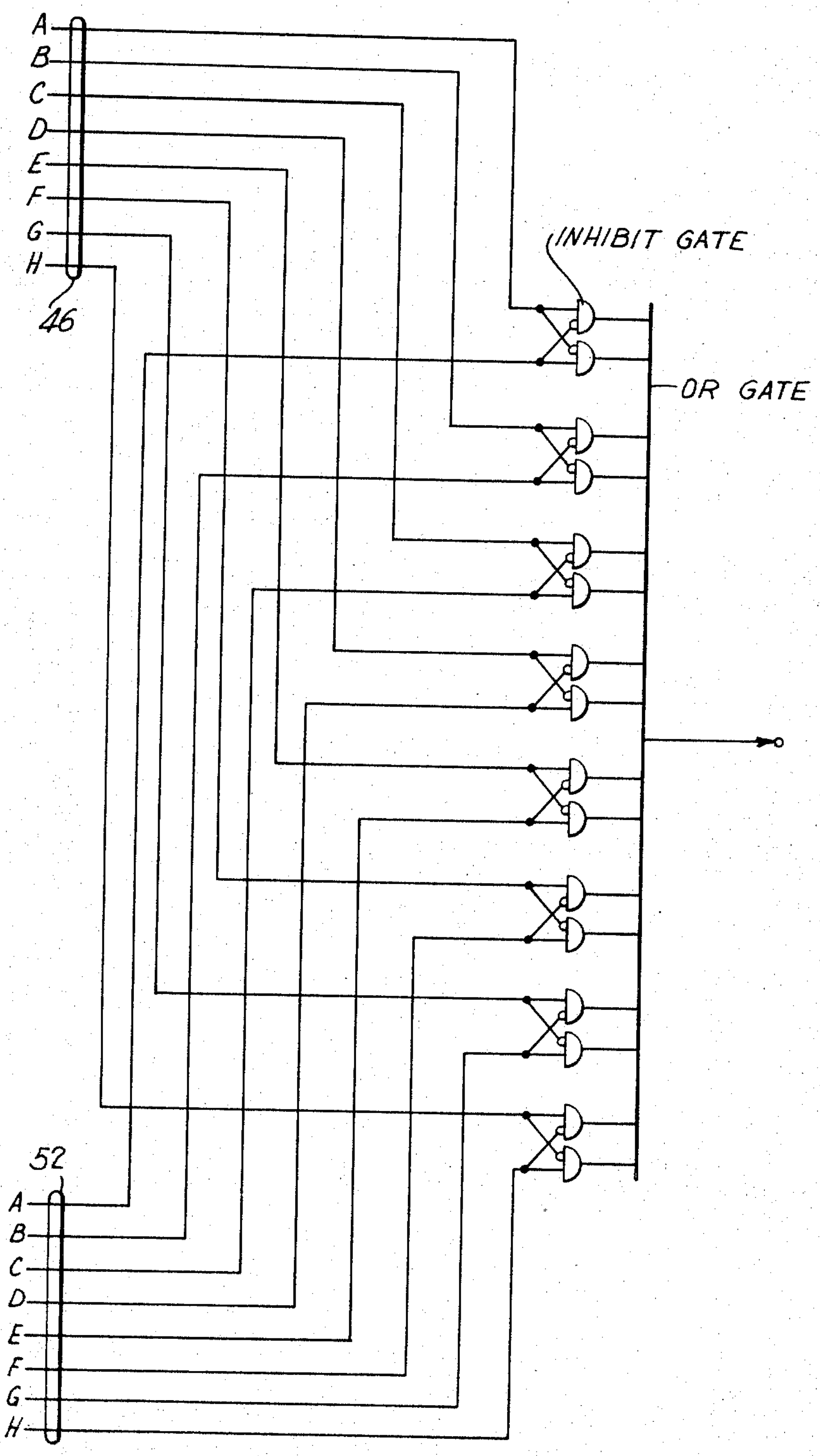
FIG. 7 PRIOR ART
FIG. 7 is a block diagram of a known embodiment of a collator which may be utilized in FIG. 2.

A collator 43 may comprise any suitable collator such as, for example, that shown in FIG. 7. The circuit of FIG. 7 is a known circuit and utilizes known inhibit gates and a known OR gate, shown in FIGS. 4 and 5, respectively. One set of inputs of the collator 43 is coupled to the outputs of the second shift register 31 via the lead 34, an AND gate 44, a lead 45 and a lead 46 and to the outputs of the counter 5 via the lead 14, an AND gate 47, a lead 48 and the lead 46. The other set of inputs of the collator 43 is coupled to the outputs of the first shift register 22 via a lead 49, an AND gate 51 and a lead 52.

The collator 43 collates the first check digit P in the output of the counter 5 with the first check digit read out from the magnetic drum 23 and collates the second check digit Q in the output of the second shift register 31 with the second check digit read out from said magnetic drum.

The outputs of the second shift register 31 are supplied to an input of the AND gate 44 via a lead 53. A read signal is supplied to another input of the AND gate 44 via a read terminal 54, a lead 55, a lead 56 and a lead 57. The control signal Y is supplied to the third input of the AND gate 44 via the terminal 36, the lead 37 and a lead 58. The outputs of the AND gates 44 and 47 are connected in common to the one set of inputs of the collator 43 via the lead 46.

The outputs of the counter 5 are supplied to an input of the AND gate 47 via the lead 14. The read signal is supplied to another input of the AND gate 47 via the read terminal 54, the lead 55 and the lead 56. The control signal X is supplied to the third input of the AND gate 47 via the terminal 17, the lead 18 and a lead 59. The outputs of the first shift register 22 are supplied to one input of the AND gate 51. The read signal is supplied to another input of the AND gate 51 via the read terminal 54, the lead 55 and a lead 61. The control signal $\overline{XY}$ is supplied to the third input of the AND gate 51 via a terminal 62 and a lead 63.

An AND gate 64 is interposed in the lead 38. The outputs of the first shift register 22 are supplied to an input of the AND gate 64 via the lead 38. The read signal is supplied to the other input of the AND gate 64 via the terminal 54 and the lead 55.

When the read signal and the control signal X are supplied to the AND gate 47 via the leads 55 and 18, respectively, said AND gate is switched to its conductive condition. When the read signal and the control signal X are supplied to the AND gate 47, they are also supplied to the AND gate 51 via the leads 55 and 63, respectively, and said AND gate 51 is switched to its conductive condition. When the AND gates 47 and 51 are in their conductive condition, the first check digit P provided by the counter 5 and the first check digit P recorded or stored on the magnetic drum 23 are collated with each other by the collator 43.

When the read signal and the control signal Y are supplied to the AND gate 44 via the leads 55 and 37, respectively, said AND gate is switched to its conductive condition. When the read signal and the control signal Y are supplied to the AND gate 44, they are also supplied to the AND gate 51 via the leads 55 and 63, respectively, and said AND gate 51 is switched to its conductive condition. When the AND gates 44 and 51 are in their conductive condition, the second check digit Q provided by the second shift register 31 and the second check digit Q recorded or stored on the magnetic drum 23 are collated with each other by the collator 43.

In FIGS. 8 and 9, details of the AND gate groups 7, 16, 19, 44, 47, 51 and 64 of the circuit of FIG. 2 are shown.

In the AND gate group 7, the lead 6 corresponds to the terminal group 100 of FIG. 8. The write signal terminal 8 of FIG. 2 corresponds to the terminal 101 of FIG. 8. The $\overline{XY}$ signal terminal 11 of FIG. 2 corresponds to the terminal 102 of FIG. 8. The lead 21 of FIG. 2 corresponds to the terminal group 103.

In the AND gate group 16, the lead 14 of FIG. 2 corresponds to the terminal group 100 of FIG. 8, the write signal terminal W of FIG. 2 corresponds to the terminal 101 of FIG. 8. The X signal terminal 17 of FIG. 2 corresponds to the terminal 102 of FIG. 8. The lead 21 of FIG. 2 corresponds to the terminal group 103 of FIG. 8.

In the AND gate 19, the lead 34 of FIG. 2 corresponds to the terminal group 100 of FIG. 8. The write signal terminal W of FIG. 2 corresponds to the terminal 101 of FIG. 8. The Y signal terminal 36 of FIG. 2 corresponds to the terminal 102 of FIG. 8. The lead 21 of FIG. 2 corresponds to the terminal group 103 of FIG. 8.

In the AND gate group 44, the lead 53 corresponds to the terminal group 100 of FIG. 8. The Y signal terminal 36 of FIG. 2 corresponds to the terminal 101 of FIG. 8. The read signal R terminal 54 of FIG. 2 corresponds to the terminal 102 of FIG. 8. The lead 45 of FIG. 2 corresponds to the terminal group 103 of FIG. 8.

In the AND gate group 47, the lead 14 of FIG. 2 corresponds to the terminal group 100 of FIG. 8. The X signal terminal 17 of FIG. 2 corresponds to the terminal 101 of FIG. 8. The read signal terminal 54 of FIG. 2 corresponds to the terminal 102 of FIG. 8. The lead 48 of FIG. 2 corresponds to the terminal group 103 of FIG. 8.

In the AND gate group 51, the lead 49 of FIG. 2 corresponds to the terminal group 100 of FIG. 8. The $\overline{XY}$ signal terminal 62 of FIG. 2 corresponds to the terminal 101 of FIG. 8. The read signal R terminal 54 of FIG. 2 corresponds to the terminal 102 of FIG. 8. The lead 52 of FIG. 2 corresponds to the terminal group 103 of FIG. 8.

In the AND gate group 64, the lead 49 of FIG. 2 corresponds to the terminal group 104 of FIG. 9. The read signal R terminal 54 of FIG. 2 corresponds to the terminal 105 of FIG. 9. The lead 38 of FIG. 2 corresponds to the terminal group 106 of FIG. 9.

FIGS. 10 and 11 illustrate the source of the control signals X, Y and $\overline{XY}$ which are fed to the inputs 17, 36 and 11, respectively, as shown in FIG. 2. FIGS. 10 and 11 also illustrate the route or circuit path through which the control signals are supplied to the respective terminal of FIG. 2, and include a timing diagram. In FIG. 10, W represents the time during which the write signal W is ON, R the time during which the read signal R is ON, X represents the time during which the X signal is ON, Y represents the time during which the Y signal is ON, and t stands for time.

In FIG. 11, a pulse generator 110 generates a pulse for each digit. A counter 111 steps one step each time it receives a pulse from the pulse generator 110 and transmits a pulse to a lead 118 when it has received seventeen pulses. The pulse produced by the counter 111 is supplied to the circuit of FIG. 2 via the terminal 17. The pulse supplied to the circuit of FIG. 2 via the terminal 17 is the X signal. Counter 111 also transmits a pulse to a lead 119 after it has received eighteen pulses from the pulse generator 110. The pulse in the lead 119 is supplied to the circuit of FIG. 2 via the terminal 36. The pulse supplied to the circuit of FIG. 2 via the terminal 36 is the Y signal.

If there is a pulse from the pulse generator 110 simultaneously with the supply of a write signal W from an external circuit, the AND gate group 16 is switched to its conductive condition. A pulse is transmitted to the terminal 8. The pulse at the terminal 8 is supplied to FIG. 2 and is the write signal W. If a pulse is supplied from the pulse generator 110 when a read signal R is supplied, the AND gate group 117 is switched to its conductive condition. A pulse is transmitted to the terminals 54. The pulse at the terminal 54 is supplied to the circuit of FIG. 2 and is the read signal R.

The signal $\overline{XY}$ is provided by a NOT circuit 113 and 114 and an AND gate 115 of FIG. 11. The output signal is supplied to the corresponding terminal of FIG. 2 via the terminal 11.

We claim:

1. Circuit arrangement for checking stored information comprising counter means for determining a first check digit by counting specific bits in each of the information, said counter means having inputs and outputs; input means for supplying stored information of N digits each including a determined number of bits to the inputs of said counter means; a plurality of AND gates; first shift register means having two types of outputs and two types of inputs, one of the two types of inputs being coupled through said AND gates to the outputs of said counter means for storing the first check digit; magnetic storage means; write means connected to one of the two types of outputs of said first shift register means and positioned in operative proximity with said magnetic storage means for recording data including said first check digit in said magnetic storage means; readout means connected to the other of the two types of inputs of said first shift register means and positioned in operative proximity with said magnetic storage means for reading out information from said magnetic storage means; an additional plurality of AND gates; second shift register means having an input coupled to said input means and outputs coupled to the one of the two types of inputs of said first shift register means through said additional AND gates for determining a second check digit by counting determined digits of the supplied information and transferring the counted determined digits to said first shift register means; collating means having an output and inputs coupled to the outputs of said counter means, of said second shift register means and of said first shift register means for collating the first check digit in the output of said counter means with the first check digit read out from said magnetic storage means and for collating the second check digit in the output of said second shift register with the second check digit read out from said magnetic storage means; and feedback means coupled between the outputs of said first shift register means and said input means for adding parity bits to said stored information.

2. Circuit arrangement as claimed in claim 1, wherein said input means includes register means and said counter means comprises a binary counter.

3. Circuit arrangement as claimed in claim 1, further comprising an EXCLUSIVE OR gate and wherein the input of said second shift register means is coupled to said input means via said EXCLUSIVE OR gate.

4. Circuit arrangement as claimed in claim 1, further comprising an AND gate connected between said input means and inputs of said first shift register means for transferring the storage information to said first shift register means under the control of a write signal and an additional signal.

5. Circuit arrangement as claimed in claim 1, further comprising an AND gate connected between the outputs of said counter means and inputs of said first shift register means for transferring the output of said counter means to said first shift register means under the control of a write signals and an additional signal.

6. Circuit arrangement as claimed in claim 1, further comprising an AND gate connected between the outputs of said second shift register means and inputs of said first shift register means for transferring the output of said second shift register means to said first shift register means under the control of a write signal and an additional signal.

7. Circuit arrangement as claimed in claim 1, further comprising an AND gate connected between the outputs of said counter means and an input of said collating means for transferring the output of said counter means to said collating means under the control of a read signal and an additional signal, and another AND gate connected between the outputs of said first shift register means and another input of said collating means for transferring the output of said first shift register means to said collating means under the control of said read signal and an additional signal.

8. Circuit arrangement as claimed in claim 1, further comprising an AND gate connected between the outputs of said second shift register means and an input of said collating means for transferring the output of said second shift register means to said collating means under the control of a read signal and an additional signal, and another AND gate connected between the outputs of said first shift register means and another input of said collating means for transferring the output of said first shift register means to said collating means under the control of said read signal and an additional signal.

9. In a circuit arrangement for checking stored information, an error signal checking system for checking error signals by adding two types of check digits to information of N digits each having T bits, said error signal checking system comprising counter means for counting the bit in the same bit position within each information digit to provide the first check digit; dividing means for dividing all the information of N digits into T small groups composed of digits at intervals of T digits; and shift register means for counting all the bits within said small groups to provide the second check digit.

* * * * *

F-5166

FO-1050
(5/69)

UNITED STATES PATENT OFFICE
CERTIFICATE OF CORRECTION

Patent No. 3,718,903 Dated February 27, 1973

Inventor(s) MITSUO OISO and YASUO ENDO

It is certified that error appears in the above-identified patent and that said Letters Patent are hereby corrected as shown below:

In the heading to the printed specification there should be included --Foreign Application Priority Data September 28, 1966 Japan.......Tokugansho - 41-6389 1--

Signed and sealed this 17th day of September 1974.

(SEAL)
Attest:

McCOY M. GIBSON JR.
Attesting Officer

C. MARSHALL DANN
Commissioner of Patents